Sept. 12, 1950 — H. WATERS — 2,521,814
STRATO-REFRIGERATION
Filed Jan. 22, 1945
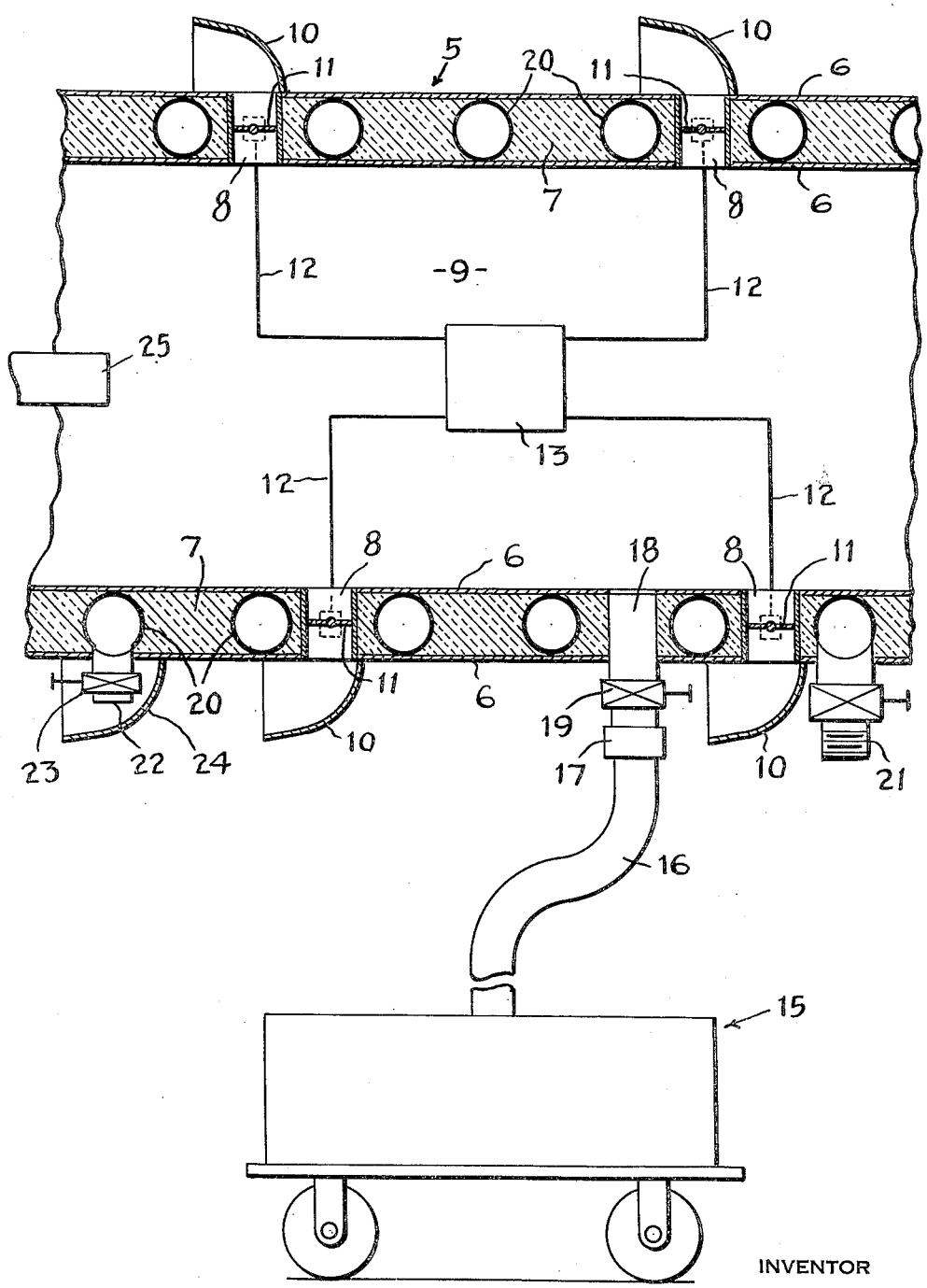
INVENTOR
Harry Waters

UNITED STATES PATENT OFFICE 2,521,814

STRATO-REFRIGERATION

Harry Waters, New York, N. Y.

Application January 22, 1945, Serial No. 573,966

4 Claims. (Cl. 99—192)

This invention relates to improvements in refrigeration and, more particularly, to the method and means for providing refrigeration units for aircraft.

More particularly, the present invention is concerned with refrigeration units for aircraft comprising a refrigerator unit or box or food compartment built into a plane or airship and without requiring refrigeration machinery of any kind to be incorporated therein.

These novel improvements comprehend the building in of a refrigerator chamber into a plane or airship, or, where desired, of forming a cargo space as a refrigerator. To this end, the spaces or units chosen are suitably lagged with insulating material and are provided with ducts or conduits leading to the outer air. These ducts or conduits may be thermostatically controlled to regulate the amount of air passed through and around the units. On aircraft of various kinds, including cargo carriers and the like, the cruising altitude is in the range of 5,000 to 20,000 feet. A temperature drop of 1° F. is experienced for each 300 feet rise in elevation. By providing a scoop or other collecting device for the inlets of the ducts and valving the same to be thermostatically controlled it will be possible to maintain a desired temperature on the refrigerated units. The utter absence of refrigerating machinery of any kind, with the sole exception of thermostatic controls, reduces the dead weight to an absolute minimum.

Upon descending to lower altitudes, the thermostatic control automatically closes the cooling air inlets, and, the refrigerated segments or units of the aircraft, having been properly lagged, will retain the cold for an appreciable length of time.

Where aircraft are stationed on the ground for any period of time ranging from a fraction of an hour up to days, the desirably cooled or chilled condition of the refrigerated units may be maintained by temporarily connecting such units to a portable or fixed refrigerating installation. Thus, for example, the refrigerator chest or unit of the aircraft may be provided with double walled expansion chambers which can be arranged with two or more valves to seal off the unit and also to permit the connection of the chamber to the expansion side of a refrigerator assembly. A unit so arranged would be brought to and maintained at the desired temperature by the operation of the portable refrigerator and, when the job was completed, the refrigerating unit or compartment could be sealed off from the charging section and the latter uncoupled and removed. As relatively volatile vaporizing fluids are used for such refrigeration units, the sealed off expansion chambers could be vented to the air while the aircraft is in flight. As a special safety factor, an inert gas such as $CO_2$ or nitrogen could be used to purge the chamber of any residual, flammable vapor where a flammable type of refrigerant is made use of.

In large type installations such as air freighters for carrying perishable tropical fruits and the like, a cooling or expansion chamber installation may be chilled by brine pumped therethrough. With such an installation, and with at least the outlets located at the bottom of the ship, the refrigerating brine can be drawn off without any fire hazard whatsoever. Additionally, the brine-circulating pipes could then be used, in flight, for the circulation of the cold, superatmospheric currents forced therethrough. Where a balanced temperature is to be maintained in the cargo chamber for tropical fruit and the like, means can be provided for passing warm air therethrough.

The novel installations proposed herein are substantially free from mechanical or moving parts, and will, therefore, not require servicing, either in flight or on the ground. The ground installations will be permanent and portable, although where business warrants, the aircraft may be loaded in special hangars in which permanent refrigeration equipment will be included and plugged into and out of the aircraft as required.

It will be appreciated from the above, that due to the cold of the upper levels of the atmosphere no refrigeration equipment would ever be required for an aircraft while operating in such low-temperature atmospheric zones. However, due to ground conditions of relatively high temperatures and varying temperatures, varying from the cold of the wide open spaces of the America and Asia to the superheated atmospheres encountered in the deserts, it is desirable that means be provided to maintain the superatmospheric chill of the upper atmosphere in the aircraft while on the ground, and to avoid incorporating or building extra cooling equipment in the aircraft, with the necessity of constantly transporting the same as dead weight.

Where desired, the improvements of the present invention comprehend the utilization of auxiliary refrigerating equipment of a type to permit the quick-freezing in the aircraft of tropical fruits, berries and other perishables and including meat and fish as well as shell fish and crustaceans of various kinds, so that the preliminary treatments hitherto required prior to loading of the shipment may be done away with.

In the case of flowers, blooms of various kinds, and some shell fish, the desired chilled transportation may be affected by merely relying on the stratospheric chill to inhibit or cause a delicate cargo to become relatively passive and dormant. This permits the picking of fruit, blooms and other materials, which are characterized by special flavors and textures, immediately at the time of the maximum development of such flavors on the trees, vines, bushes, etc., as opposed to present conditions where fruit, vegetables, and the like must be picked in a semi-ripe condition in order to stand even the most rapid shipment available.

Advantage of the cold of the upper atmosphere may be made use of by initial flights into the higher altitudes to effect quick freezing of the cargo, after which the aircraft may "go downstairs" to a suitable lower flying level for continuing the trip and maintain the already attained frozen condition. Under such circumstances, the quick-frozen cargo may be discharged, within an hour after landing, into refrigerated conveyances without losing any of the effects of the quick freeze.

At air ports and emergency landing fields where it might be found impractical to maintain standing refrigerating equipment, the invention comprehends the maintenance and use of supplies of solid carbon dioxide, or conventional ice-salt and chemical cold producing devices, all suited for standby use. With such emergency equipment, refrigerants may be placed in the top of cargo spaces, in properly spaced units, to insure maintenance of the proper cold or chilled effect in the refrigerated chamber.

The character and type of aircraft to which this invention may be applied is not limited, as no extra weight in mechanical refrigerating equipment is required to be built in or installed.

A special feature of advantage of the present system, particularly as respects the handling of perishable crops, is the fact that processing equipment is no longer required in the farm or growing areas, as the essential quick-freezing may be readily accomplished by air transportation units according to the principles of this invention. Where quick freezing equipment is available at the earth's surface, an airplane can be flown at a cruising level of about 6,000 feet to maintain the contents subject to an ambient atmospheric temperature of 20° F. and an effective average drop of temperature of 1° F. for each 300 feet elevation. Without such ground freezing or pre-freezing, a plane would have to be taken up some 30,000 feet to secure the quick freezing effect from the atmosphere.

From a consideration of the above factors, it will be seen that there is an inexhaustable actual refrigerator or refrigerating medium in the air above the troposphere which can be readily availed of by flying.

In the use of hermetically sealed, liquid-tight packages for food, as described in my prior patents and pending applications, pressure chambers or cabins will be provided in order to prevent the bursting of the packages in the rarified upper atmosphere. The pressure chambers or refrigerating units will desirably be of metal, or lined and shelved with metal so that the cooling effect of the atmosphere or other coolant may be transferred to the sealed packages. The shelving or metal selected will desirably be one having a high conductivity, such as copper and aluminum, or silver-plated iron or steel. With foods preliminarily cooked in fin-seamed, hermetically sealed packages, such as described in my about-to-be-issued application Serial No. 341,798, filed June 22, 1940, now Patent No. 2,369,765 granted February 20, 1945, the handling, shipment and storage of food under conditions of double protection is permitted, due to the fact that the preliminarily packaged sterilized food maintained strictly quiescent and dormant by the quick freezing process. For my own bag constructions, where appreciable head space and seam room is provided in the original package, the question of expansion on freezing is not critical, and pressure chambers will not be required. However, where packages are made with close seaming and little or no head space provided, they will have to be treated in pressure chambers. In this present modification, sterilization, followed by quickfreezing of materials, such as soups, is of particular advantage, as it is well known that soups which have been prepared one day and then allowed to stand overnight under conditions of cooling acquire a tempered condition and develop flavors which are not met with in a freshly prepared soup.

Special advantages are also obtained in the treatment of corn. Under ordinary conditions in canning establishments corn is usually steam-cooked for about 20 minutes. A four-minute cook would be ideal, but there is not sufficient bactericidal effect to permit this, particularly where corn is stored on open shelves under varying conditions of temperature for extended periods of time, so that any viable organisms contained therein have ample opportunity to incubate and develop. With the present process the desirable four minute cooking period can be used and followed immediately by quick freezing, with the result that an absolutely sanitary package will be had in which any organisms present are maintained strictly dormant and incapable of propagation. Such a product, kept under proper refrigeration conditions, may be held indefinitely and, when ready for use, will merely require warming to taste.

The invention is illustrated in the accompanying drawing in which the figure is a diagrammatic view thereof, parts being in section and parts in elevation.

Referring again to said drawing the reference numeral 5 designates a fragmentary portion of the aircraft or a compartment thereof. The walls 6 are suitably lagged with an insulating material 7.

A plurality of ducts or conduits 8 lead from the refrigerating chamber 9 to outside air. The ducts are provided with hoods 10 which act as scoops to force the air into the refrigerator chamber when the aircraft is in transit. The ducts function as cooling air inlets and are provided with valves 11 thermostatically controlled through lines 12 leading to a conventional form of thermostatic control indicated at 13. Upon descending to lower altitude the thermostatic control automatically closes the cooling air inlets and the compartment having been suitably insulated will contain the cold for an appreciable length of time.

The reference numeral 15 designates a portable refrigeration unit of conventional construction. Obviously if desired this could be a stationary unit. When the aircraft is grounded and refrigeration is necessary the connection 16 is coupled at 17 with a duct 18 leading into the refrigeration compartment 9. The duct 16 has a valve 19 so that it may be closed after the connection 16 has been uncoupled.

For large type installations pipes 20 could be provided to function as a brine circulating system to be used when the aircraft is grounded. The brine or other cooling agent could be pumped into the valved inlet 21 and before the aircraft takes off the brine could be drawn off through the inlet 21. If desired the brine-circulating pipes could be used in flight for the circulation of cold air. For this purpose an inlet duct 22 is provided. The duct 22 has a valve 23 and a hood 24 which functions as a scoop to drive the cold air into the system.

If conditions prevail where it might be desirable to warm the air a pipe 25 may lead warm air from the engine into the refrigerating chamber.

What is claimed is:

1. The method of preparing food stuffs comprising introducing food in steaming-hot condition into an oversize fin-seam container having appreciable head space, sealing the mouth of the container at a distance from the level of the contents while the head space is full of vapor, then quick-freezing the sealed package, and maintaining the quick-frozen package under refrigerated conditions.

2. The method of preparing food stuffs comprising introducing food in steaming-hot condition into an oversize fin-seam container having appreciable head space, sealing the mouth of the container, packaging the sealed container for air transport, and immediately transporting said containers by air under conditions adapted to immediately effect quick-freezing of the contents of the packages.

3. The method of preparing food stuffs comprising introducing food in steaming-hot condition into a liquid-tight bag, sealing the bag, and shipping the sealed bags in pressure-tight containers in aircraft under operating conditions such that the packaged material is quick-frozen at the start of the flight and maintained frozen until desired for use.

4. The method of refrigerated shipment of perishable succulent crops such as berries, melons, fresh vegetables and the like, comprising picking the plant-ripened food stuffs at the time of optimum growth and flavor, immediately packaging and stowing said food stuffs in air transports and flying said cargo to market, the said cargo being initially subjected to quick-freezing or chilling by atmospheric influences while in flight.

HARRY WATERS.

REFERENCES CITED

The following references are of record in the file of this patent:

UNITED STATES PATENTS

| Number | Name | Date |
| --- | --- | --- |
| 2,115,344 | Stacey | Apr. 26, 1938 |
| 2,280,827 | Hoveman | Apr. 28, 1942 |